United States Patent [19]

Gage, Sr. et al.

[11] Patent Number: 4,890,091
[45] Date of Patent: Dec. 26, 1989

[54] SELF CONTAINED COLLISION AVOIDANCE LIGHT

[76] Inventors: Gene F. Gage, Sr.; George Spector, both of 816 E. Corte Oro, Phoenix, Ariz. 85020

[21] Appl. No.: 252,383
[22] Filed: Sep. 30, 1988
[51] Int. Cl.⁴ .............................................. B60Q 1/30
[52] U.S. Cl. .................... 340/467; 307/10.1; 340/463
[58] Field of Search .............. 340/71, 62, 693, 467, 340/463; 200/61.45 R; 307/10.1, 10.8

[56] References Cited

U.S. PATENT DOCUMENTS

| 3,501,742 | 3/1970 | Ellison | 340/71 |
| 3,748,643 | 7/1973 | Jacobs | 340/71 |
| 4,404,549 | 9/1983 | Berg | 340/636 X |
| 4,667,177 | 5/1987 | Athalye | 340/71 |

FOREIGN PATENT DOCUMENTS

| 1918574 | 8/1973 | Fed. Rep. of Germany | 340/71 |
| 2295855 | 7/1976 | France | 340/71 |

Primary Examiner—Reinhard J. Eisenzopf
Assistant Examiner—Robert W. Mueller

[57] ABSTRACT

A self contained deceleration system for a motor vehicle is provided and consists of a housing affixed to rear portion of the motor vehicle. An inertia switch is electrically connected within the housing into a circuit with a power source and a red stop light. When the motor vehicle decelerates the inertia switch will momenterally close allowing the red stop light to illuminate to indicate that the motor vehicle is slowing down.

2 Claims, 1 Drawing Sheet

SELF CONTAINED COLLISION AVOIDANCE LIGHT

BACKGROUND OF THE INVENTION

The instant invention relates generally to speed sensing devices and more specifically it relates to a self contained deceleration system for a motor vehicle.

Numerous speed sensing devices have been provided in prior art that are each adapted to indicate a decrease in the acceleration of a motor vehicle to the motor vehicles traveling behind. For example, U.S. Pat. Nos. 3,332,060; 4,097,842 and 4,384,269 all are illustrative of such prior art. While these units may be suitable for the particular purpose to which they address, they would not be as suitable for the purposes of the present invention as heretofore described.

SUMMARY OF THE INVENTION

A primary object of the present invention is to provide a self contained deceleration indication system for a motor vehicle that will overcome the shortcomings of the prior art devices.

Another object is to provide a self contained deceleration indication system for a motor vehicle that requires no external wiring for the system operates from its own self contained power source and inertia switch.

An additional object is to provide a self contained deceleration indication system for a motor vehicle in which the system contains a self contained solar cell to maintain the electrical properties of the power source.

A further object is to provide a self contained deceleration indication system for a motor vehicle that is simple and easy to use.

A still further object is to provide a self contained deceleration indication system for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
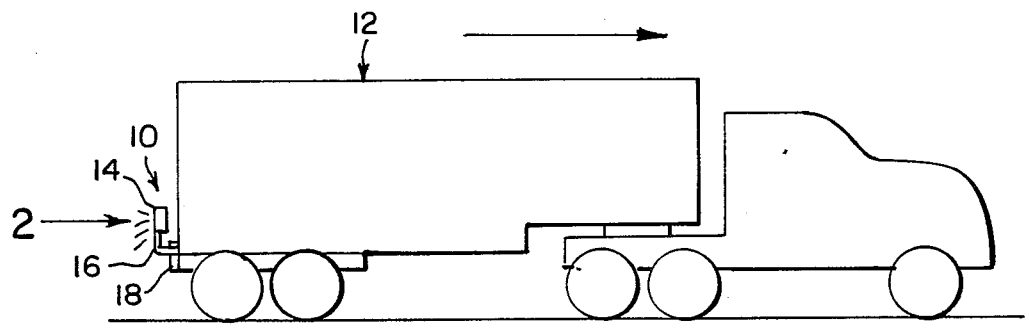
FIG. 1 is a side view of a motor vehicle being a trailer truck with invention installed on rear bumper.
Figure 2:
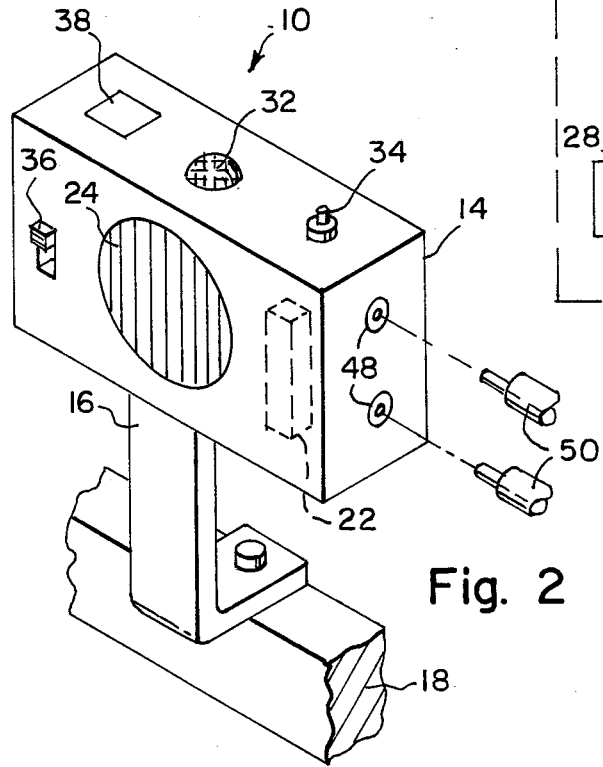
FIG. 2 is a perspective view of the invention as indicated by numeral 2 in FIG. 1, showing the plug in jacks ready to be inserted.
Figure 3:
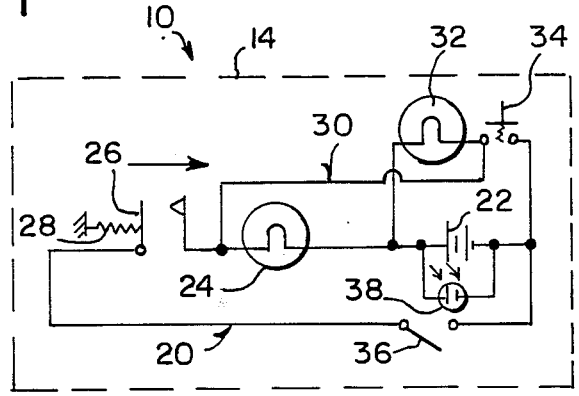
FIG. 3 is a schematic view of the circuit of the invention.

Turning now descriptively to the drawings, in which similar reference characters denote similar elements throughout the several views, the FIGS. illustrate a self contained deceleration indication system 10 for a motor vehicle 12, such as a tractor trailer or the like. The system 10 contains a housing 14 and a mounting bracket 16 for affixing the housing 14 to rear portion 18, such as a bumper of the motor vehicle 12.

An electrical circuit 20 is disposed within the housing 14, with a power source being a battery 22, a red stop light 24 and an inertia switch 26 electrically connected into the circuit 20. The inertia switch 26 is normally biased in an open position by a spring 28 and is electrically connected into the circuit 20. When the motor vehicle 12 declerates the inertia switch 26 will momenterally go into a closed position allowing the red stop light 24 to illuminate to usually indicate that the motor vehicle 12 is slowing down.

A second parallel electrical circuit 30 is disposed within the housing 14 and is electrically connected to the battery 22. An amber test light 32 and a test button switch 34 are disposed on the housing 14 and electrically connected into the second circuit 30. The test button switch 34 is normally spring biased in an open position so that when the test button switch 34 is manually depressed the second circuit 30 will close allowing the amber test light 32 to illuminate to indicate that the battery 22 is functioning.

An on-off switch 36 is electrically connected into the first circuit 20 so that a person (not shown) can manually turn the first circuit 20 on and off when so desired. A solar cell 38 is electrically connected to the battery 22 so as to recharge the battery 22 during daylight hours.

Figure 4:
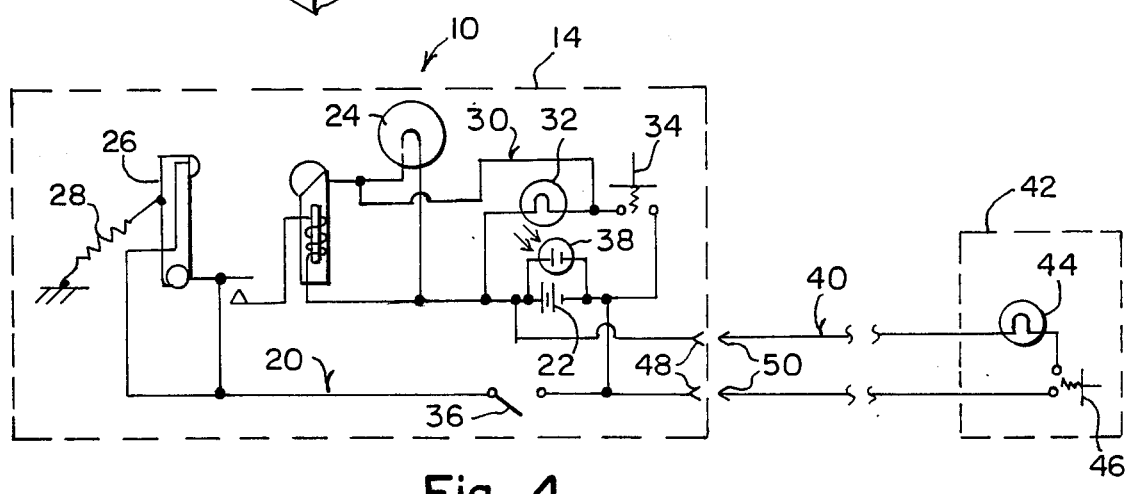
FIG. 4 is a schematic view of the circuit in a modification whereby a electro-magnetic inertia switch is utilized and a remote battery tester on the dashboard can be plugged into the circuit.

The inertia switch 26, as shown in FIG. 4, is electromagnetic to better retain the inertia switch 26 in the closed position whereby reduction of inertia allows the spring 28 to overcome the magnetic force thus returning the inertia switch back to its open position.

A third parallel electrical circuit 40 is disposed between the housing 14 and a dashboard 42 of the motor vehicle 12 and is electrically connected to the battery 22. A remote amber test light 44 and a remote test button switch 46 are electrically connected into the third circuit 40 and disposed into the dashboard 42. When the remote test button switch 46 is manually depressed the third circuit will close allowing the remote amber test light 44 to illuminate to indicate that the battery 22 is functioning.

The third circuit 40 further contains a pair of female plugs 48 disposed into side of the housing 14 and a pair of male jacks 50. The jacks mate with the plugs 48 so that the remote amber test light 44 and the remote test button switch 46 can be electrically engaged to and disengaged from the battery 22 when so desired.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A self contained deceleration system for a motor vehicle which comprises:
 (a) a housing:
 (b) means for affixing said housing to rear portion of the motor vehicle;
 (c) a first electrical circuit disposed within said housing;
 (d) a power source electrically connected into said first circuit;

(e) a red stop light electrically connected into said first circuit;

(f) an inertia switch normally spring biased in an open position and electrically connected into said first circuit whereby when the motor vehicle decelerates said inertia switch will momentarily go into closed position allowing said red stop ligh to illuminate to visually indicate that the motor vehicle is slowing down, wherein said affixing means is a mounting bracket, further comprising;

(g) a second parallel electrical circuit disposed within said housing and electrically connected to said power source;

(h) an amber test light disposed on said housing and electrically connected into said second circuit;

(i) a test button switch normally spring biased in an open position and disposed on said housing and electrically connected into said second circuit so that when said test button switch is manually depressed said second circuit will close allowing said amber test light to illuminate to indicate that said power source is functioning, further comprising an on-off switch electrically connected into said first circuit so that a person can manually turn said first circuit so that a person can manually turn said first circuit on and off when so desired, wherein said power source is a battery, further comprising means for recharging said battery, wherein said recharging means is a solar cell electrically connected to said battery so as to recharge said battery during daylight hours, wherein said inertia switch is electromagnetic to better retain said inertia switch in the closed position whereby reduction of inertia allows the spring to overcome the magnetic force thus returning said inertia switch back to its open position, further comprising:

(j) a third parallel electrical circuit disposed between said housing and a dashboard of the motor vehicle and electrically connected to said battery:

(k) a remote amber test light electrically connected into said third circuit and disposed into the dashboard; and (l) a remote test button switch normally spring biased in an open position, electrically connected into said third circuit and disposed into the dashboard so that when said remote test button switch is manually depressed said third circuit will close allowing said remote amber test light to illuminate to indicate that said battery is functioning.

2. A self contained deceleration system as recited in claim 1 wherein said third circuit further comprises:

(a) a pair of female plugs disposed into side of said housing and (b) a pair of male jacks to mate with said plugs so that said remote amber test light and said remote test button switch can be electrically engaged and disengaged from said battery when so desired.

* * * * *